July 18, 1950
C. C. KAJDAN
2,516,004
PARACHUTE HARNESS
Filed Oct. 14, 1946
3 Sheets-Sheet 1
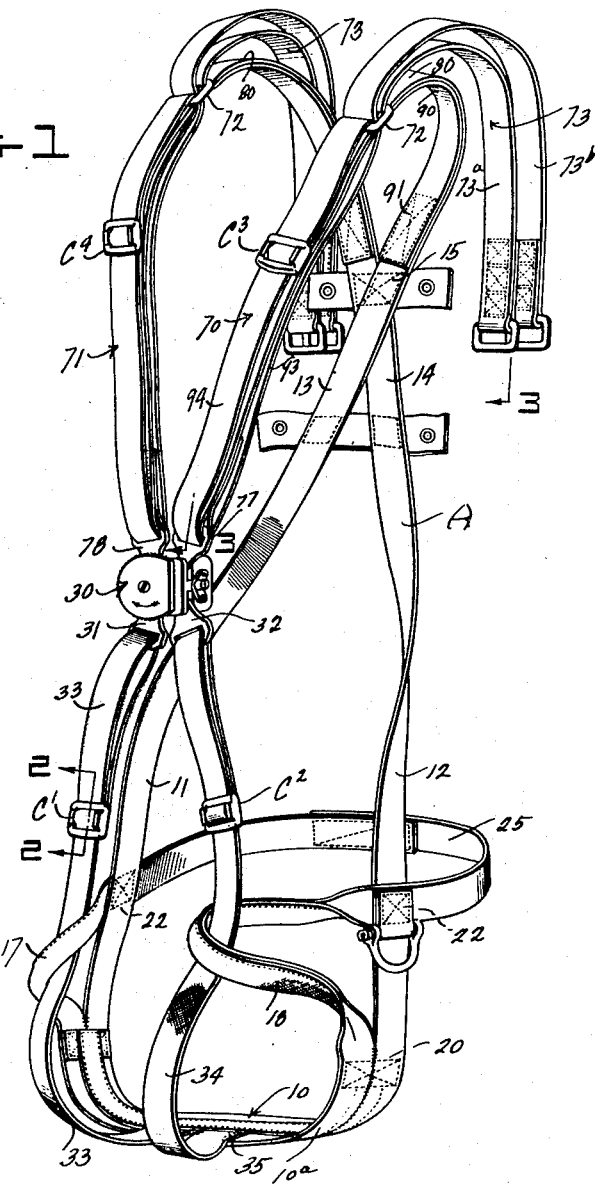
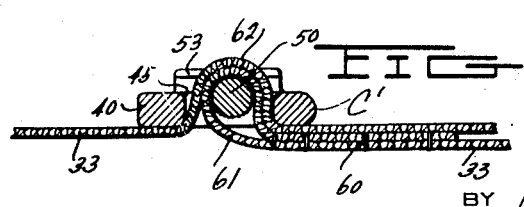
INVENTOR.
Chester C. Kajdan
BY
ATTORNEYS.

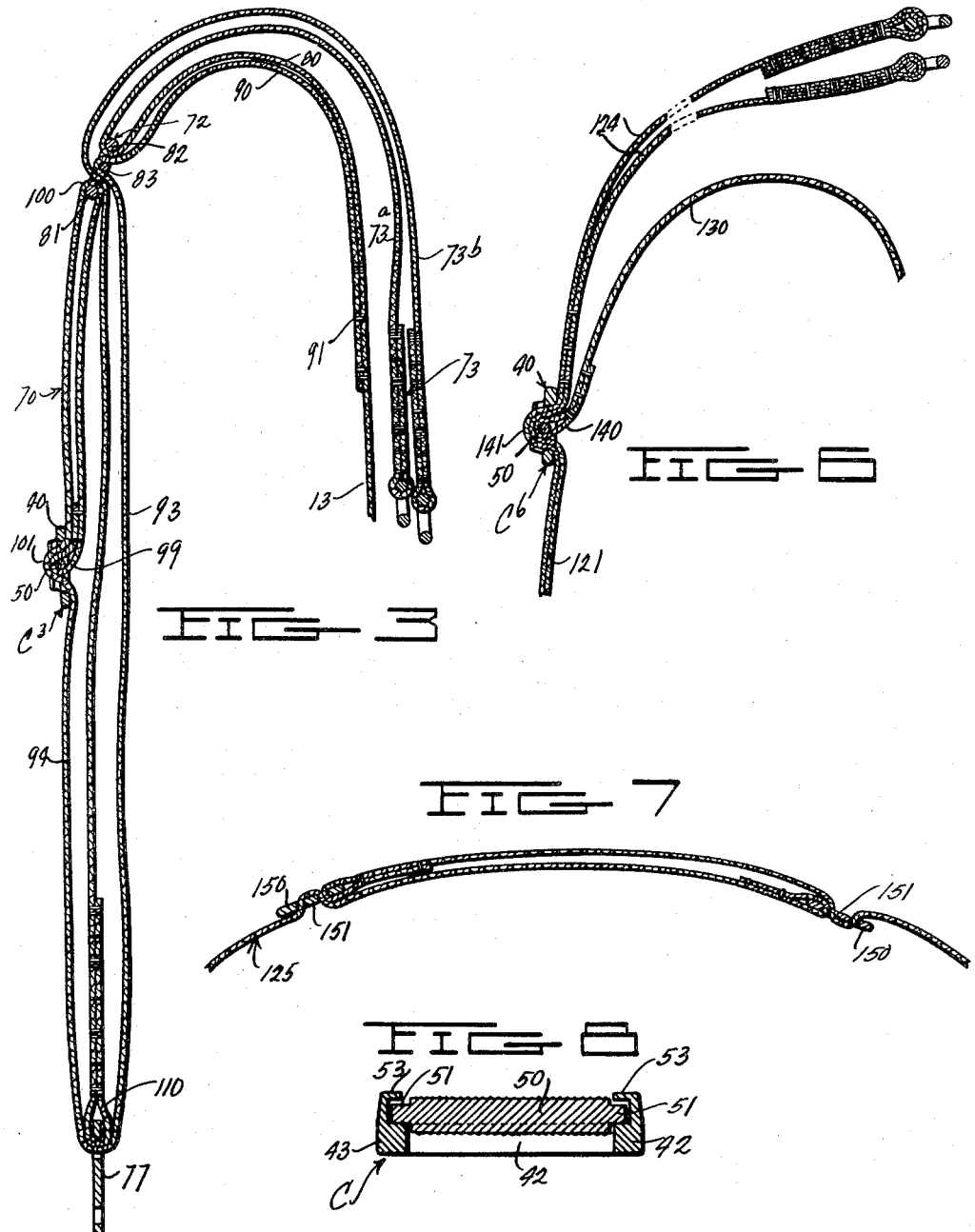

July 18, 1950     C. C. KAJDAN     2,516,004
PARACHUTE HARNESS
Filed Oct. 14, 1946     3 Sheets-Sheet 3
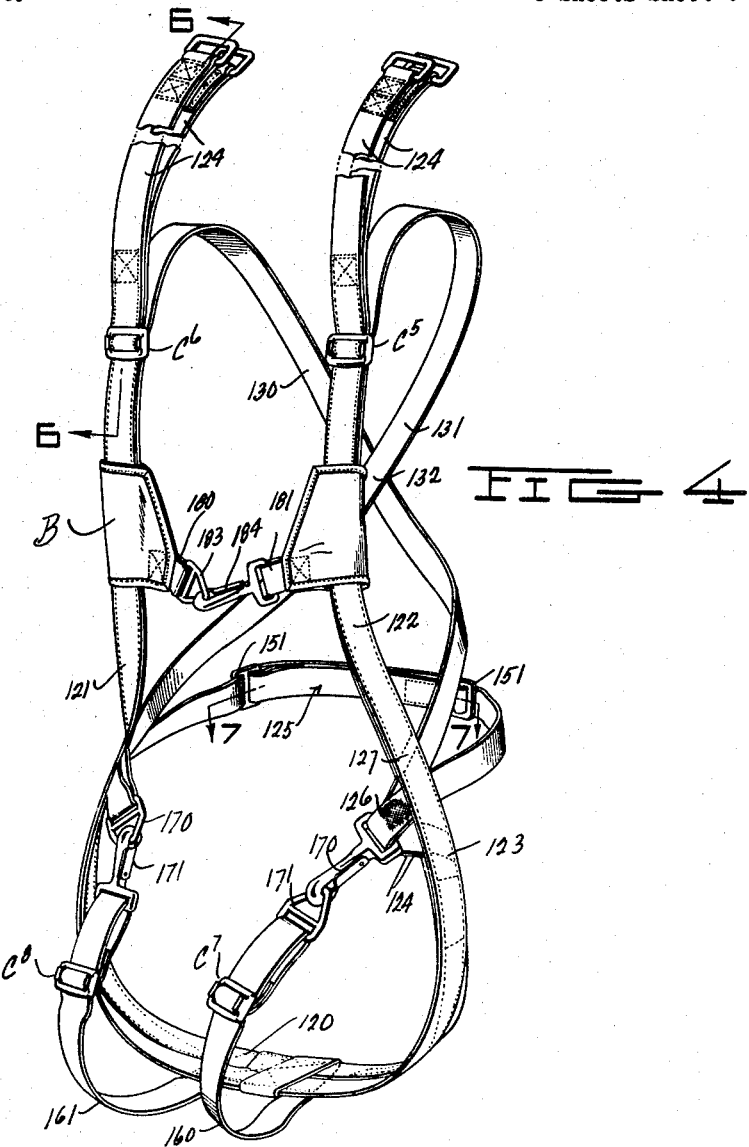
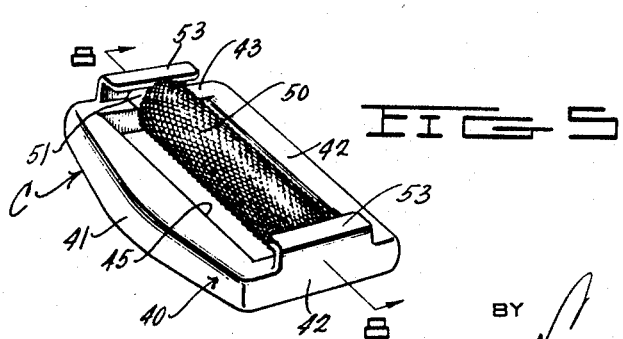
INVENTOR.
Chester C. Kajdan
BY
ATTORNEYS.

Patented July 18, 1950

2,516,004

UNITED STATES PATENT OFFICE 2,516,004

PARACHUTE HARNESS

Chester C. Kajdan, Buffalo, N. Y., assignor to Irving Air Chute Co., Inc., Buffalo, N. Y., a corporation Application October 14, 1946, Serial No. 703,133

3 Claims. (Cl. 244—151)

This invention relates to improvements in parachute harnesses.

The primary object of this invention is the provision of an easily adjusted parachute harness having a novel adapter connection for its straps.

A further object of this invention is the provision of improved adjusting adapter arrangement for parachute harnesses.

A further object of this invention is the provision of a friction locking type of adapter used in an improved association with the straps of parachute harnesses such as the leg straps, riser strap, suspension webs, etc.

In present types of parachute harnesses adapters used are of the eye type having rigid cross bars or other means associated therewith to enable the webs of the harness to be secured in relative arrangement. Adjustments are cumbersome. This is disadvantageous because it is desirable that a parachute harness be quickly adjustable for use by individuals of different stature. Heretofore it has been proposed to use a friction type of adjuster having lockable friction means to prevent the webbing to move in one direction, but no one to my knowledge has proposed the use of such type of adapter upon the main parts of the harness so that all of the harness straps can be adjusted with facility; the webbing parts of the harness being so associated that there are no free ends to handle in effecting the adjustment. It is therefore a purpose of the present invention to provide a harness either of the multiple or single connected type, the associated parts of which are connected with a slide type of friction adapter so that all parts of the harness may be efficiently adjusted in an expeditious manner.

Other objects and advantages of the invention will be apparent from the following detailed description taken in connection with the accompanying drawings, forming a part of this specification, and in which drawings—

Figure 1 is a perspective view of the quick release back type harness showing the improved adjusting adapter arrangement associated therewith.

Figures 2 and 3 are cross sectional views taken substantially on the respective lines shown in Figure 1.

Figure 4 is a perspective view of a three coupling snap type connector harness showing the improved friction type adjuster adapters associated therewith.

Figure 5 is a perspective view of the improved friction type adapter.

Figures 6, 7 and 8 are cross sectional views taken substantially on the respective lines shown in Figures 4 and 5 of the drawings.

In the accompanying drawings, wherein for the purpose of illustration are shown preferred and modified forms of harness having improved adapter arrangements, the letters A and B generally designate the types of harness shown in Figures 1 and 4 respectively.

Referring to the harness A showing a single point release harness of the type set forth in Patents 1,899,656; 2,011,520; 2,016,235 and 2,040,-533, the same may include a rather broad sling type seat 10 having riser webs 11 and 12 extending therefrom which cross at the normal sides of the wearer to provide back straps 13 and 14. They are extensions of the straps 11 and 12 respectively and cross at a stitch connected point 15, from whence they extend upwardly to provide shoulder straps, as will be subsequently described.

The sling seat 10 includes a strap portion 10ª, really a part of the sling seat, from which extend integral leg strap receiving loops 17 and 18 formed by doubling the strap material upon itself and stitching it in tubular formation to stiffen the loops. These straps 17 and 18 are stitched at 20 to the adjacent lower ends of the riser webs 11 and 12 and they are also stitched or otherwise secured at 22 to the riser webs 11 and 12 a short distance above the sling seat to provide loops which receive the leg straps. The straps 17 and 18 are then continued rearwardly to provide a back strap 25 which may have an adjustment therein similar to the adjustment shown in the cross back strap of the harness of Figure 4 to be subsequently described.

The single point release coupling device 30 is of the general nature set forth in the above mentioned patents and it is adapted to receive fastener clips 31 and 32 upon the ends of the leg straps 33 and 34. The latter are secured at 35 upon the sling seat strap 10ª and extend upwardly; being adapted for fitting through the loops 17 and 18. At their outer ends the leg straps 33 and 34 are doubled upon themselves and threaded through the fastener clips 31 and 32; the ends being secured by means of the adapters C¹ and C² which are of the identical construction shown for the adapter C of Figure 5.

The adapter or coupling C shown in detail in Figures 5 and 8, consists of a forged hardened steel slotted coupling ring 40 which includes the spaced bar portions 41 and 42 connected in parallelism by end or side bars 42 and 43. These portions 41–43 inclusive provide an eye opening 45. Associated with this coupling portion 40 is a strap securing cross or locking bar 50 having reduced ends 51 adapted to rest and slide along the bars 42 and 43; locking cross bar 50 being externally knurled and adapted to move across the eye opening 45 between the bars 41 and 42. The reduced extensions 51 are flattened on their bases so that the locking bar cannot turn. Retainer portions 53 are provided upon the end bar portions 42 which extend upwardly from the upper surfaces thereof and then are flanged inwardly over the reduced ends 51. These retainers do not prevent removal of the cross bar 50 from the portion 40 but merely prevent its movement therefrom normal to the plane of the eye portion 40. There is some clearance in the space between the overhanging flange of the retainer 53 and the surfaces of the bar portions 42 upon which the cross bar slides, as shown in Figure 8, to facilitate movement of the cross bar relative to the plane of the ring portion 40 for attaching and adjustment purposes. It will be noted that due to the segmental shape of the reduced ends 51 the latter cannot turn in the sockets provided by the retainer portions 53 and thus, of course, the cross bar 50 cannot turn when it is seated in position upon the ring 40.

Referring now to the association of the leg straps 33 and 34 and their adapters $C^1$ and $C^2$, as shown in Figure 2 the leg strap end is doubled upon itself and stitched at 60 to provide a loop portion 61 which receives the cross or locking bar 50. The leg strap, intermediate its end, is threaded at a crimped portion 62 into the eye opening 45 around the assembled locking bar 50. It is perfectly apparent that a pull in either direction will slide the locking bar 50 for frictionally locking the straps in their thus assembled adjustment in position against adjustment. The adjustment can readily be effected due to the loose association of the cross bar through manipulation by the operator, but when in position upon the individual the adjustment cannot be accidentally disturbed.

For general classification, the completed upper portion of the harness A further includes the upper front strap assemblages 70 and 71 secured by conventional adapters 72 to the suspension sling 73, and intermediate their ends including adapters $C^3$ and $C^4$ of the type shown in Figures 5 and 8. The straps 70 and 71 are provided with fastener clips 77 and 78 adapted for detachable connection with the single point release coupling 30 in a manner well understood in the art.

Referring to a detailed discussion of the associated straps 70—73 and 71—73, the cross sectional view of Figure 3 plainly shows the adapter connection and adjustment. The back strap 13 or 14, as the case may be, extends upwardly to provide a shoulder strap 80. Conventional adapter 72 is of the type providing end connected spaced bars 81 and 82 and an intermediate smaller bar 83 integrally connected with respect to the bars 81 and 82 and dividing the eye opening of the ring or adapter 72 into two portions. The strap 80 extends at its shoulder portion upwardly and is threaded through one eye opening of the adapter 72 and then turned around the bar portion 82 and terminates in one length $73^a$ of the suspension webbing. The shoulder strap arrangement is further provided with a strap portion 90 secured at 91 by stitching to the upper portion of the back strap, as shown in Figure 3, and thence extends through one of the openings of the adapter 72 through the other opening of said adapter around the cross bar 83 and extends downwardly at 93; being threaded through the opening of the fastener clip 77 and thence extending upwardly at 94. This portion 94 is doubled upon itself; at its upper end portion being provided with a permanently formed loop 99 through which the locking cross bar 50 of the friction adapted $C^3$ is threaded. The doubled upper portion of the strap section 94 is threaded at 100 through the lower opening of the adapter 72 and thence extends downwardly and is crimped at 101 and threaded through the eye opening of the adapter $C^3$ around the locking bar secured loop 99, as shown in Figure 3.

The suspension webbing also includes a section $73^b$ which is threaded through the lower opening of the adapter 72 and is permanently loop connected at 110 to the fastening clip 77 between the sections 93 and 94 above described.

It is apparent from the foregoing that four of the types of friction locking adapters C are used upon the harness A; two of them for the leg straps and two of them for the upper front straps. Of course this type of adapters may also be used in lieu of the adapter 72 and the cross back strap 25 may likewise embody such adapters. It will be readily apparent that there are no loose ends whatsoever upon the harness and inasmuch as the ends of the harness are secured to the lock bar, the adjustment may be readily effected and maintained against liability of accidental displacement.

Referring to the snap fastener coupling type of harness shown in Figure 4, in general the same is well known in the art, being shown in such U. S. patents as 1,560,366 and 2,162,236. It includes a sling seat 120 of web portions secured together side by side to provide a wide sling seat; the two webs forming the sling seat 120 being extended upwardly in overlapped stitch secured relation to provide front and side type riser webs 121 and 122 which terminate in split suspension sling straps 124. On the lower portions of the riser webs 121 and 122 double webbing is stitched or secured at 123 and this double webbing shown at 124 in Figure 4 is then extended, one portion from one riser web to the other to provide an adjustable back strap 125, and the other web looped forward slightly to provide a snap fastener loop 126; the same being secured at 127 to the riser web above the location 123 and thence extended upwardly and rearwardly to provide a back strap. The back straps 130 and 131 thus provided cross at 132 in nonconnected relation. Therefrom the back straps are extended as shoulder straps for connection to the friction locking type of adjusters $C^5$ and $C^6$ of the type C shown in Figures 5 and 8.

The means of connecting the back straps to the riser webs by couplings or adapters $C^5$ and $C^6$ is shown in Figure 6. The shoulder strap 130 is provided with a permanently stitched loop 140 at its end, through which the lock bar 50 is threaded; the loop entering from the opposite side of the opening of the portion 40. The double webbing of the riser web 121 is crimped at 141 through the opening of the portion 40, and extended around the loop 140 on the lock bar. Both locking adjusters are secured in the same manner to the riser webs and shoulder straps.

The adjustable back strap 125 is really a two part strap, the ends from each riser web being provided with double opening adapter rings 150 including permanently affixed central cross bars 151 around which the intermediate portion of the other strap is crimped in order to effect the adjustment, as shown in Figure 7.

The sling ring 120 is provided with leg straps 160 and 161 secured by stiffened stitching effect and interwoven with the two web portions of the sling seat as shown in Figure 4. They are doubled upon themselves at their ends. The adjustment is effected by means of friction locking adapters $C^7$ and $C^8$ of the type C above described. The adapters $C^7$ and $C^8$ are secured to the doubled portions of the leg straps in the same manner as shown in Figure 2 and above described for the form of harness A.

The loops 124 of the riser webs and the ends of the leg straps may be provided with complementary coupling parts 170 and 171. While they are shown in the drawing as of the snap fastener type, they obviously may be of any approved construction.

A breast strap arrangement may be provided, consisting of strap ends or portions 180 and 181 respectively secured to the riser webs 121 and 122 and having complementary coupling parts 183 and 184.

In every instance, on both types of harnesses A and B, it will be noted that the strap end has a permanent loop which is secured to the locking bar of the adapter C. The locking bar is freely slipped through this permanent loop opening and, of course, assemblage is facilitated due to the detachable arrangement of the locking bar with respect to the ring of the adapter. The crimped portion of the strap is slipped through the opening of the ring portion from the same side of the opening of the ring at which the permanent loop at the end of the strap enters; this arrangement effecting an adjustment which is locked whenever a strap is pulled in either direction substantially in the plane of the adapter. Due to the loose fitting arrangement of the slidable locking bar the strap adjustment may be quickly effected.

Various changes in the shape, size and arrangement of parts may be made to the form of invention herein shown and described without departing from the spirit of the invention or the scope of the following claims.

I claim:

1. In a parachute harness the combination of a suspension sling having riser webs, leg straps, back and shoulder straps and upper front connecting straps, said shoulder and upper front connecting straps having an adjustable locking adapter and the leg straps having an adjustable locking adapter therein to effect adjustment of said harness straps, each of said adjusting adapters including a ring having an opening therein through which certain of the harness straps are crimped and a locking bar slidable upon said ring across said opening having a portion of the strap fixedly looped thereon and extended through the opening of the crimp of the other strap portion between said crimp and the ring.

2. In a parachute harness the combination of a U-shaped supporting sling including a seat portion and upwardly extending riser webs terminating in suspension straps, shoulder straps, and locking adapters securing the ends of said shoulder straps to said riser webs intermediate the ends of the latter, each of said locking adapters comprising a ring having an eye opening therethrough and a locking bar slidably positioned upon said ring and slidable back and forth thereon across said opening, the shoulder strap having a non-adjustable fixed connection upon the locking bar and threaded through the opening from one side of said ring, and the riser web being crimped through said opening of the ring from the same side as that from which the shoulder straps extend, the crimp being extended around said locking bar so that movement of the locking bar in either direction along said ring will lock the adjustment of the shoulder strap relative to the riser web.

3. In a parachute harness the combination of an adjustable shoulder strap and upper front body strap arrangement, an adapter including a pair of eye openings divided by a cross bar therebetween, the shoulder strap including a plurality of ends one of which is threaded through both eye openings around said cross bar and the other of which is threaded through one opening and extended to provide a suspension line, said shoulder strap after passing through said adapter extending to provide a portion of a front body strap doubled upon itself to provide outer and inner portions, a coupling fastener part upon said doubled strap, a second adapter including an eye providing ring and a locking bar slidable thereon across said opening, the outer portion of the front strap being crimped intermediate its ends extending through said eye opening of the second adapter ring and frictionally crimped about the locking bar thereof and thence extending through an opening of the first adapter and at its extreme end being secured to the locking bar of the second adapter, and a second suspension line threaded through an opening of the first mentioned adapter and secured to said coupling fastener part.

CHESTER C. KAJDAN.

REFERENCES CITED

The following references are of record in the file of this patent:

UNITED STATES PATENTS

| Number | Name | Date |
| --- | --- | --- |
| 1,178,136 | Cowell | Apr. 4, 1916 |
| 1,560,366 | Ball | Nov. 3, 1925 |
| 1,784,162 | Smith | Dec. 9, 1930 |
| 1,882,381 | Davis | Oct. 11, 1932 |
| 2,011,520 | Kuhlemann | Aug. 13, 1935 |
| 2,405,671 | Quilter | Aug. 12, 1946 |